United States Patent [19]

Yang

[11] Patent Number: 5,281,245
[45] Date of Patent: Jan. 25, 1994

[54] FLUE GAS TREATMENT APPARATUS AND FLUE GAS TREATMENT SYSTEM

[75] Inventor: Yun Suk Yang, Jounanci, Rep. of Korea

[73] Assignee: Sanko' Industry Corporation, Chiba, Japan

[21] Appl. No.: 839,752

[22] PCT Filed: Jul. 31, 1991

[86] PCT No.: PCT/JP91/01020
§ 371 Date: Jan. 3, 1992
§ 102(e) Date: Jan. 3, 1992

[87] PCT Pub. No.: WO92/02292
PCT Pub. Date: Feb. 20, 1992

[30] Foreign Application Priority Data
Aug. 3, 1990 [JP] Japan .................. 2-207404

[51] Int. Cl.$^5$ ........................... B01D 45/12
[52] U.S. Cl. .......................... 55/237; 55/345; 417/151; 417/152
[58] Field of Search ............... 55/53, 55, 68, 80, 189, 55/195, 196, 345, 346; 417/105, 151, 152

[56] References Cited

U.S. PATENT DOCUMENTS

| | | | |
|---|---|---|---|
| 3,826,273 | 7/1974 | Brown | 417/151 X |
| 3,830,064 | 8/1974 | Byonicki | 417/151 X |
| 4,278,405 | 7/1981 | Angle | 417/150 |
| 4,348,364 | 9/1982 | Gartside et al. | 55/345 X |
| 4,580,948 | 4/1986 | Schmidlin | 417/151 X |
| 4,820,131 | 4/1989 | Johnson | 417/151 X |
| 4,846,617 | 7/1989 | Ehrhordt | 417/151 X |

*Primary Examiner*—Charles Hart
*Attorney, Agent, or Firm*—Lowe, Price, LeBlanc & Becker

[57] ABSTRACT

This invention relates to a flue gas treatment apparatus for treating flue gas in which a contaminant in the form of fine solid particles and a gaseous air pollutant are mixed. In the flue gas treatment apparatus, a gas suction portion (29a) for drawing flue gas therethrough is formed in a funnel (27), jet nozzles (30a, 30b, 30c) for jetting out compressed gas along an inner peripheral wall of the funnel 27 are provided adjacent the gas suction port (29a), and a discharge port (27a) is formed in a lower part of the funnel (27).

4 Claims, 8 Drawing Sheets

FIG. 7-1

| Measurement targets and units | | | Measurement results | | Lower limit of quantitative analysis | Measurement method |
|---|---|---|---|---|---|---|
| | | | At entrance of dust collector | At exit of dust collector | | |
| Volume of flue gas (wet) | | $m^3{}_N/h$ | 521 | 242 | — | JIS Z 8808 |
| Volume of flue gas (dry) | | $m^3{}_N/h$ | 451 | 235 | — | |
| Water content of flue gas | | vol.% | 13.5 | 3.0 | 0.1 | JIS Z 8808 |
| Gas analysis data | $CO_2$ | vol.% | 3.6 | 2.6 | | |
| | $O_2$ | vol.% | 16.8 | 17.7 | | |
| | CO | vol.% | 0.0 | 0.0 | 0.1 | JIS B 7983 |
| | $N_2$ | vol.% | 79.6 | 79.7 | | |
| | Ratio of air | — | 4.84 | 6.06 | — | |
| Concentration of soot and dust | | $m^3{}_N/h$ | 16.2 | 0.02 | 0.01 | JIS Z 8808 |
| Discharge concentration of soot and dust | | | $O_2$ 12% converted value | 0.05 | — | |
| Concentration of sulfur oxides | | vol.ppm | 562 | 15 | 5 | JIS K 0103 |
| Discharge quantity of sulfur oxides | | $m^3{}_N/h$ | — | 0.003 | — | |

FIG.7-2

| Measurement targets and units | | Measurement results | | Lower limit of quantitative analysis | Measurement method |
|---|---|---|---|---|---|
| | | At entrance of dust collector | At exit of dust collector | | |
| Concentration of nitrogen oxides | vol.ppm | 37 | 15 | 10 | JIS K 0104 |
| Discharge concentration of nitrogen oxides | $O_2$ 12% converted value | 41 | — | JIS K 0104 |
| Concentration of hydrogen chloride | $mg/m^3N$ | 134 | 34 | 3 | JIS K 0107 |
| Discharge concentration of hydrogen chloride | | $O_2$ 12% converted value | 92 | — | JIS K 0107 |
| Concentration of ammonia | vol.ppm | 0.25 | 0.25 | 0.01 | JIS K 0099 |
| Concentration of hydrogen sulfide | vol.ppm | 18 | 1.0 | 0.005 | Standard-1 |
| Concentration of methylmercaptan | vol.ppm | Not detected | Not detected | 0.005 | Standard-1 |
| Concentration of methyl sulfide | vol.ppm | 20 | 7.2 | 0.005 | Standard-1 |
| Concentration of methyl disulfide | vol.ppm | 0.10 | Not detected | 0.005 | Standard-1 |
| Concentration of trimethylamine | vol.ppm | 0.15 | Not detected | 0.005 | Standard-1 |
| Concentration of acetaldehyde | vol.ppm | Not detected | Not detected | 0.01 | Standard-1 |
| Concentration of styrene | vol.ppm | 5.2 | 1.6 | 0.01 | Standard-1 |
| Concentration of propionic acid | vol.ppm | Not detected | Not detected | 0.01 | Standard-1 |

FIG. 7-3

| Measurement targets and units | | Measurement results | | Lower limit of quantitative analysis | Measurement method |
|---|---|---|---|---|---|
| | | At entrance of dust collector | At exit of dust collector | | |
| Concentration of n-butyric acid | vol. ppm | Not detected | Not detected | 0.005 | Standard-1 |
| Concentration of n-valeric acid | vol. ppm | Not detected | Not detected | 0.005 | Standard-1 |
| Concentration of iso-valeric acid | vol. ppm | Not detected | Not detected | 0.005 | Standard-1 |
| Concentration of odor | — | 3100 | 2300 | 10 | Standard-2 |

(Note) Standard-1: Notification No. SHO 47-9 of the Environment Agency.
Standard-2: Chiba Odor Preventive Measure Guideline (triangular odor bag method).
Incinerated: Used tires

FLUE GAS TREATMENT APPARATUS AND FLUE GAS TREATMENT SYSTEM

DESCRIPTION

1. Technical Field

This invention relates to a flue gas treatment apparatus and also to a flue gas treatment system, both of which are suitable for use in the treatment of flue gas in which a fine solid particulate contaminant and a gaseous air pollutant are mixed.

2. Background Art

In flue gas, substances present in a solid form, such as dust, are generally mixed in with aditional air pollutants present in a gaseous form, for example, $NO_x$.

Known conventional removal means for fine solid particles in flue gas include cyclones making use of centrifugal force and bag filters relying upon filtration.

They are all employed to separate and collect only fine solid particles from flue gas. They cannot eliminate gaseous air pollutants so most of such air pollutants are released into the atmosphere.

To remove such gaseous air pollutants, a chemical facility is additionally required to use an aqueous solution which can absorb such air pollutants. In addition to a reaction tank in which the gaseous air pollutants react with the aqueous solution, this chemical facility is also equipped with an apparatus for recirculating the aqueous solution within the facility, an apparatus for feeding a fresh aqueous solution, an apparatus for treating the aqueous solution, etc.

To treat flue gas which contains a contaminant present in a solid form and an air pollutant in a gaseous form, a system constructed with a combination of a dust collector, such as a cyclone, and a chemical facility has heretofore generally been employed.

Such a conventional flue gas treatment system is, however, accompanied by the drawback that a very large chemical facility is required. furthermore, the need to take into consideration corrosion resistance to the aqueous solution leads to a higher initial cost for the system, and the need for supply and treatment of the aqueous solution results in higher running cost.

In industrial fields where flue gas occurs in a huge volume during the course of manufacture of a product or the like, such as in the chemical and steel industries, there has hence been a strong desire for the development of a flue gas treatment system which can eliminate gaseous air pollutants without any chemical facility.

For industrial fields using an apparatus such as a small incinerator or boiler, such a flue gas treatment system is too large and too expensive. It is the current situation that, despite the immense concern about the pollution problem, no flue gas treatment system or apparatus is installed.

DISCLOSURE OF THE INVENTION

The present invention has been developed with the foregoing conventional problems in mind. An object of the present invention is, therefore, to provide an apparatus, system and method for the treatment of flue gas, which do not require any chemical facility and thus high initial and running costs.

To achieve the above object, this invention provides a flue gas apparatus characterized in that a gas suction portion for drawing flue gas therethrough is formed in a conical cylinder downwardly reduced in diameter, at least one jet nozzle is provided adjacent the gas suction port to jet out a compressed gas along an inner peripheral wall of the conical cylinder, and a discharge port is formed in a lower part of the conical cylinder.

To attain the above object, this invention also provides another flue gas treatment apparatus characterized in that the apparatus has an conical inner cylinder downwardly reduced in diameter, at least one jet nozzle for jetting out a compressed gas along an inner peripheral wall of an upper part of the conical cylinder and an outer cylinder enclosing at least the upper part of the conical inner cylinder, a gas suction portion for drawing flue gas therethrough is formed in the outer cylinder, a clearance is formed between the upper part of the conical inner cylinder and the outer cylinder to guide the flue gas, which has flowed into the outer cylinder, into the conical inner cylinder, and a discharge port is formed in a lower part of the conical inner cylinder.

To fulfill the above object, this invention also provides a flue gas treatment system characterized in that the system is equipped with the above-described flue gas treatment apparatus, the gas suction portion of which is connected to a flue gas source, and a compressed gas source for feeding the compressed gas to the jet nozzle.

Here, a plurality of such flue gas treatment apparatuses can be provided in series and/or parallel with the flue gas source. Further, a cyclone dust collector can be arranged on an upstream and/or downstream side of the flue gas treatment apparatus.

To achieve the above object, This invention also provides a flue gas treatment process characterized in that flue gas is caused to flow into a conical cylinder downwardly reduced in diameter and compressed air for forming an eddy current of the flue gas in the conical cylinder is jetted into the conical cylinder to lower the interior of the conical cylinder to a particular temperature to treat the flue gas.

As a result of several tests and extensive study, The present inventors has found that, as described above, gaseous and fine solid particulate contaminants or pollutants in flue gas can be removed by a relatively simple system without the need for the provision of any chemical facility although some of its detailed mechanism has not been fully elucidated until the present time.

To describe the system briefly, a compressed gas is jetted against a conical inner cylinder, an eddy current is formed by the compressed gas inside the inner cylinder, and solid contaminants are then removed by the resultant centrifugal force. At the same time, the temperature inside the inner cylinder is lowered by a pressure increase inside the inner cylinder by the supply of the compressed gas, adiabatic expansion of the compressed gas, and the like, so that gaseous contaminants are liquefied. The resulting liquefied contaminants are then adsorbed on the solid contaminants so that the liquefied contaminants are removed.

Before describing the present invention in detail, a principle for which this invention can bring about the aforementioned advantages will be described taking nitrogen oxides as an example for the sake of convenience.

Among pollutants responsible for air pollution, it is nitrogen oxides that are considered to be the most serious these days. Of these, nitrogen dioxide $NO_2$ is a gas which has caused particular concern in recent years with respect to the induction of the photochemical "smog" phenomenon and also for the release of its distinct offensive odor.

Nitrogen oxides occur during the course of combustion of a fossil fuel such as coal or petroleum or in a chemical process for the production of nitric acid or the like. Among these nitrogen oxides, nitrogen monoxide NO is formed as a result of a direct reaction of oxygen with nitrogen upon combustion of the above-mentioned fossil fuel whereas nitrogen dioxide $NO_2$ is formed when nitrogen monoxide is subjected to further oxidation. When cooled, this $NO_2$ undergoes a bimolecular bonding reaction and changes into colorless liquid nitrogen tetraoxide ($N_2O_4$). This reaction formula can be expressed as follows:

$$2NO_2 \leftrightarrow N_2O_4 + Q \tag{1}$$

This reaction is a reversible reaction and an exothermic reaction. When the temperature drops, the equilibrium reaction formula (1) proceeds rightwards and, at 17° C. under atmospheric pressure, the proportion of existing $NO_2$ drops to "0" and nitrogen dioxide changes completely to liquid nitrogen tetraoxide $N_2O_4$.

The equilibrium reaction formula (1) also proceeds rightwards when the pressure increases. It is therefore possible to reduce the proportion of existing $NO_2$ to "0" by raising the pressure even when the temperature is higher than 17° C.

Incidentally, details of the above reaction are described in Volume "Air" of the "Pollutant Analysis Guideline" published by the Kanto Branch of the Analytical Chemical Society of Japan.

If fine particles are present in an atmosphere in which $NO_2$ has completely changed to liquid $N_2O_4$ as described above, $N_2O_4$ even in a trace amount is absorbed on the fine particles and is thus removed.

This principle will be described by applying it to the flue gas treatment apparatus according to the present invention.

Flue gas from a flue gas source flows into the outer cylinder through the gas suction port of the outer cylinder. When the flue gas flows into the cylinder through the clearance between the outer cylinder and the conical inner cylinder, the flue gas forms a rapid eddy current owing to the compressed gas jetted out through the jet nozzles. Inside the conical inner cylinder, the pressure rises as a result of the entrance of the compressed gas but the temperature drops because of adiabatic expansion of the compressed gas.

Gaseous contaminants in the flue gas change to liquid due to the rise in pressure and the drop in temperature as described above. The air pollutants so liquefied collide with fine solid particulate contaminants in the rapid eddy current, whereby the former are adsorbed on the latter. These fine solid particles are removed under the action of centrifugal force. The air pollutants are therefore eliminated in the form adsorbed on the fine solid particles from the flue gas together with fine solid particles and are discharged through the discharge port.

To enable the present invention to bring about advantages such as those described above, it is however necessary to appropriately design the number of jet nozzles, their arrangement, the jetting angle of the compressed gas, the shape of the conical inner cylinder, the shape and size of the clearance to allow flue gas to flow into the conical inner cylinder, the flow rate of the flue gas, etc. Unless they are appropriate, the above-described advantages cannot be brought about fully. The present inventors were able to find out correlations among these parameters as a result of repetitive tests which were conducted over a long time.

As a result of several incineration tests of industrial waste such as various synthetic resins and automobile tires, the present inventors have also found that the flue gas treatment apparatus according to the present invention also has deodorizing function.

As far as is already confirmed to date, this deodorizing function is known to be exhibited by the removal of gaseous air pollutants and also by the deodorizing action of unburnt carbon components contained in fine solid particles. The deodorizing action by these unburnt carbon components is considerably different from that by ordinary carbon because the environment and the like are different from the environment for the deodorization by ordinary carbon.

This is attributed to the fact that unburnt carbon has a very large surface area because of its very fine particulate form and the deodorizing environment is under elevated pressure.

Namely, the surface area of unburnt carbon is large and the pressure of the environment is high. This increases the probability of contact between unburnt carbon and odor molecules, whereby deodorizing reactions are allowed to proceed promptly.

The present invention can also improve the collection efficiency for fine solid particles over that available from the use of an ordinary cyclone. When flue gas enters the conical cylinder, water vapor in the flue gas is liquefied due to a temperature drop so that water is formed. In addition, water is also formed upon production of compressed air. Fine solid particles are adsorbed on these water molecules, thereby making it possible to collect even those having substantially small particle sizes.

BRIEF DESCRIPTION OF THE DRAWINGS

FIG. 1 to FIG. 5 show a first embodiment of the present invention, in which

FIG. 1 is a fragmentary cross-section of a flue gas treatment system,

FIG. 2 is a transverse cross-section of a flue gas treatment apparatus,

FIG. 3 is a vertical cross-section of the flue gas treatment apparatus,

FIG. 4 is a flow sheet of the flue gas treatment system, and

FIG. 5 is a perspective view of the flue gas treatment system; and

FIGS. 6 and 7-1 through 7-3 illustrate a second embodiment, in which FIG. 6 is a flow sheet of another flue gas treatment system and FIGS. 7-1 through 7-3 are tables showing measurement results after treatment of flue gas.

BEST MODES FOR CARRYING OUT THE INVENTION

The embodiments of the present invention will hereinafter be described with reference to FIG. 1 to FIGS. 7-1 through 7-3.

The first embodiment of the present invention will now be described with reference to FIG. 1 to FIG. 5.

Figure 4:
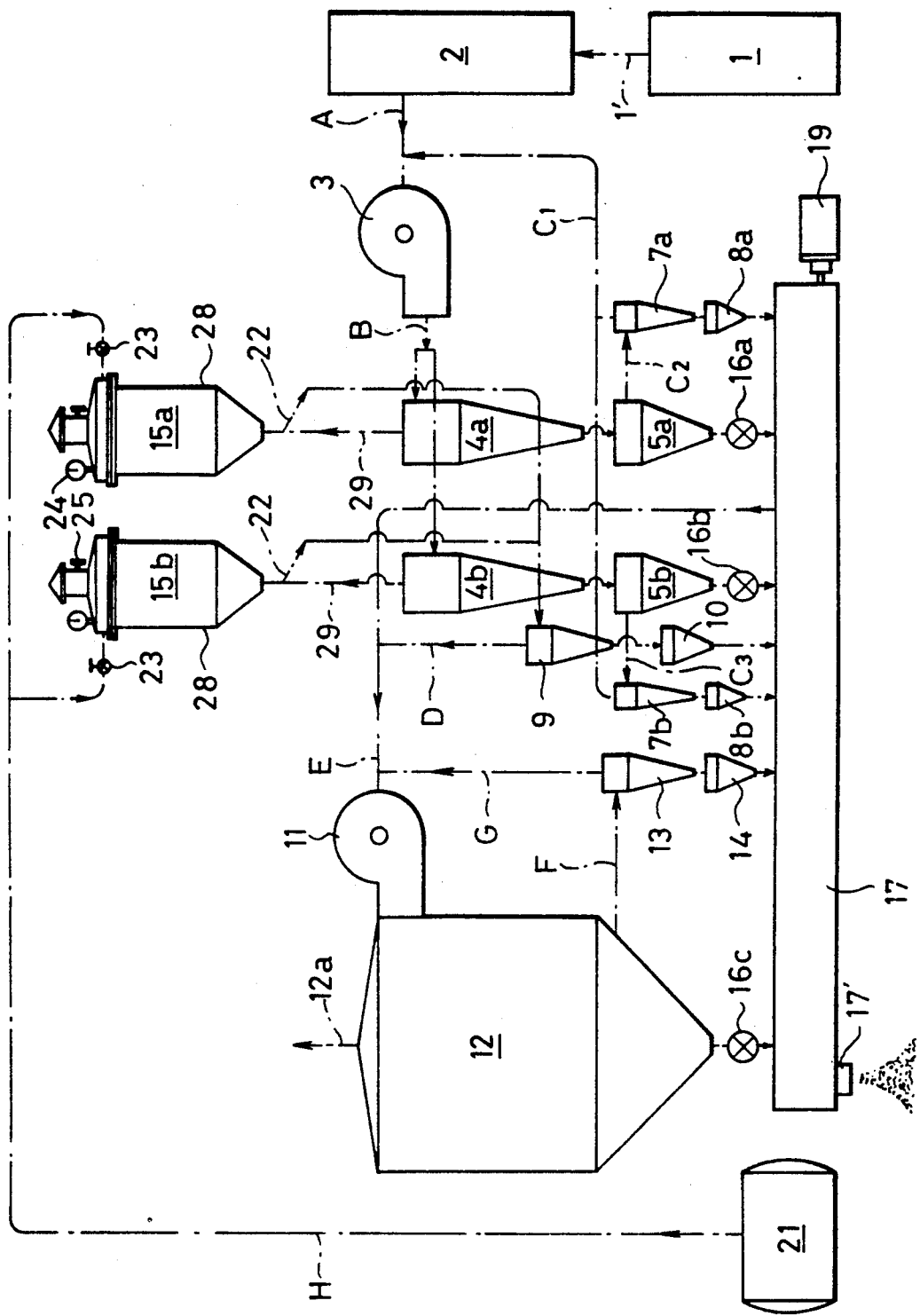
Figure 5:
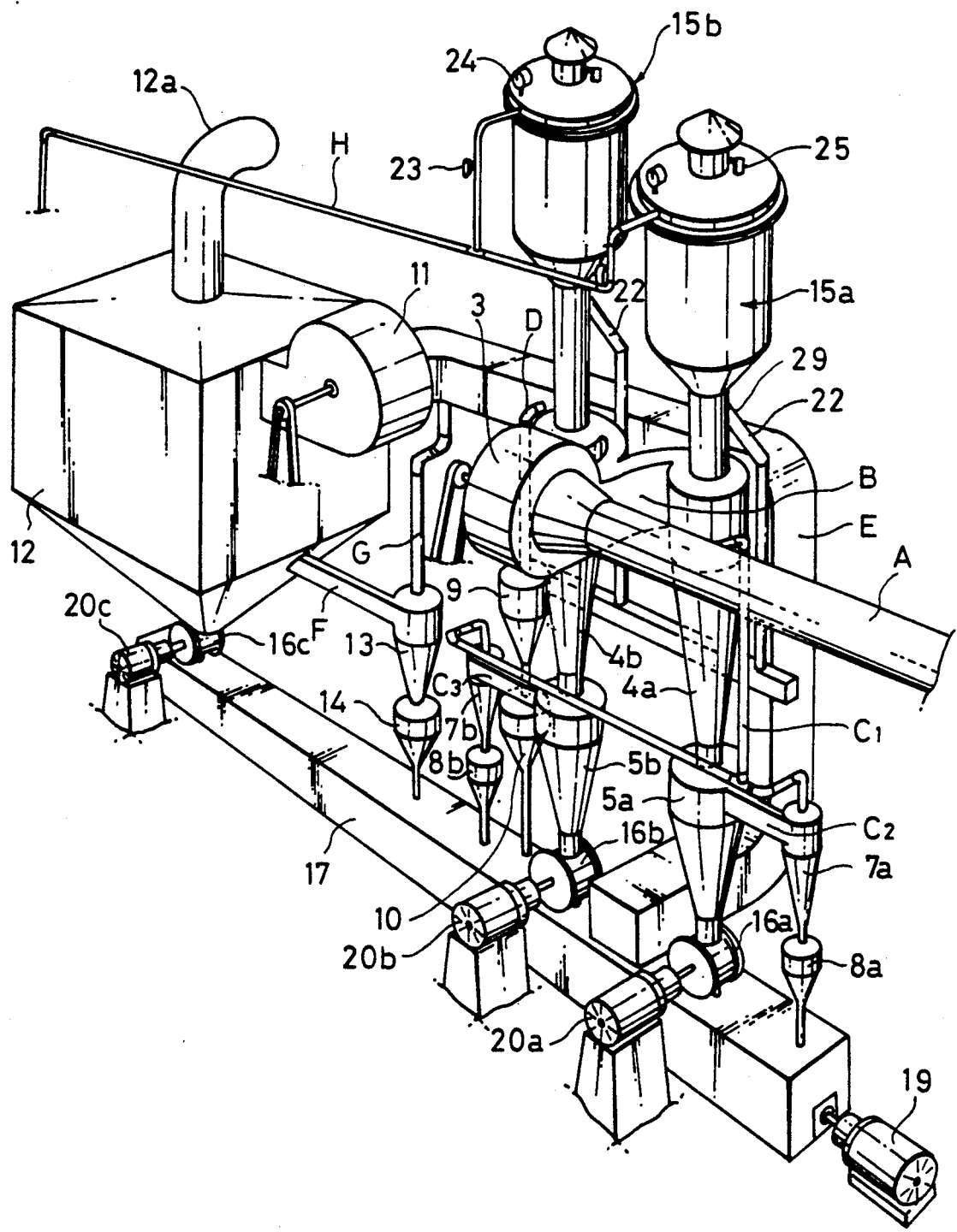

The flue gas treatment system is constructed, as shown in FIG. 4, of a cooler 2 connected to a flue-gas-producing boiler 1 to cool flue gas; blowers 3,11 for feeding flue gas into cyclones, etc.; cyclones 4a,4b for removing fine solid particles from flue gas fed by the blower 3; first auxiliary cyclones 5a,5b, second auxiliary cyclones 7a,7b, third auxiliary cyclones 8a,8b, fourth auxiliary cyclone 9, fifth auxiliary cyclone 10, sixth auxiliary cyclone 14 and seventh auxiliary cyclone 14, all of which serve to remove fine solid particles not removed by the upstream-side cyclones and the like; a multi-cyclone 12 for removing fine solid particles from flue gas fed by the blower 11; flue gas treatment apparatuses 15a,15b for removing gaseous and fine solid particulate contaminants from the flue gas; a compressor 21 for feeding compressed air to the flue gas treatment apparatuses 15a,15b; and a force feed screw 17 for conveying fine solid particles, which have been discharged from the cyclones, to a desired location.

Figure 1:
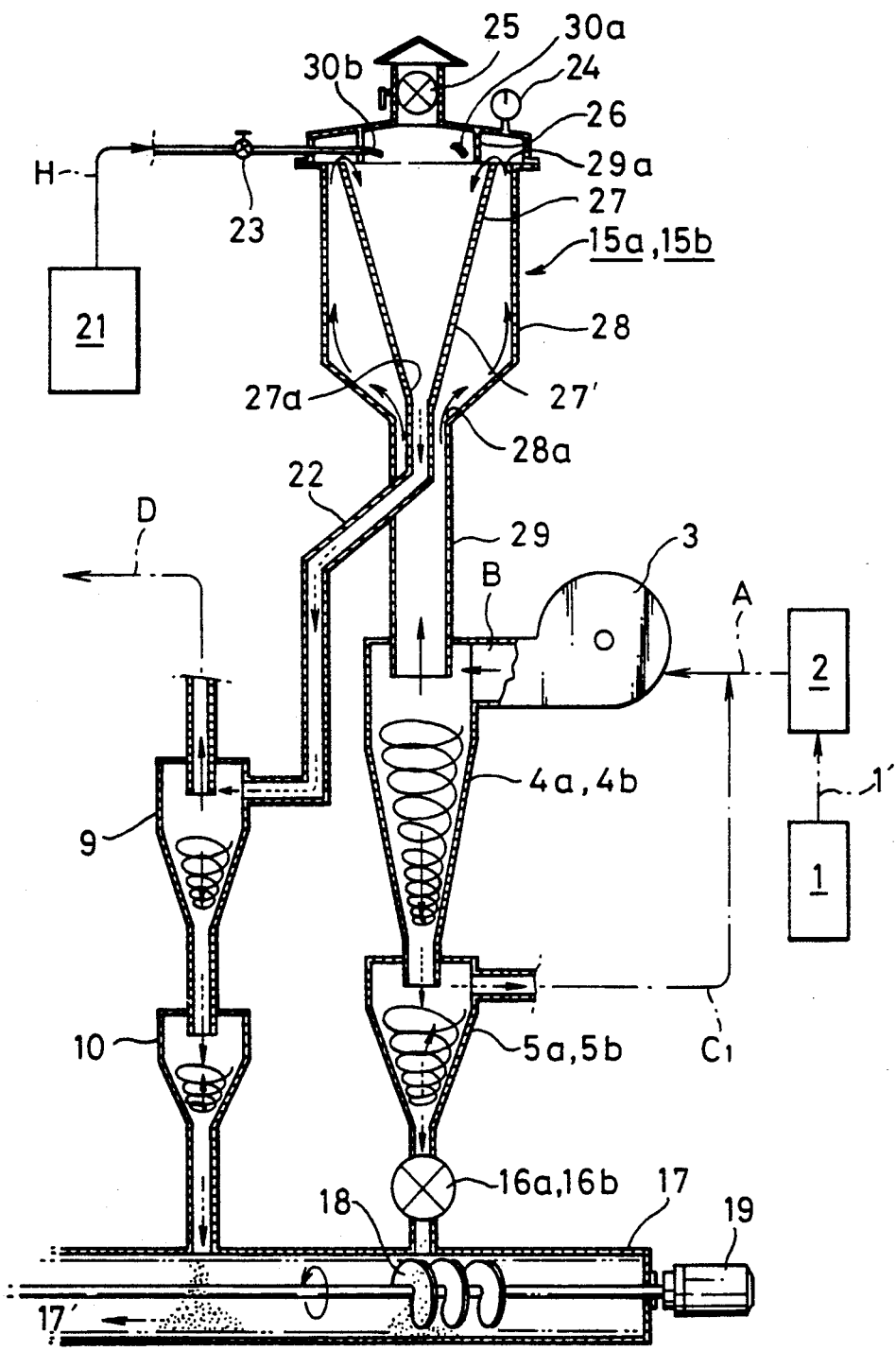

As is illustrated in FIG. 1, the flue gas treatment apparatuses 15a,15b are each equipped with an inner funnel 27, an outer cylinder 28 enclosing the inner funnel 27, three jet nozzles 30a,30b,30c for jetting out compressed air along an upper inner peripheral wall of the inner funnel 27, a pressure gauge 24 and a shut-off valve 25.

Formed in a lower part of the inner funnel 27 is a discharge port through which fine solid particles and the like are discharged. In a lower part of the outer cylinder 28, a gas suction port 28a is formed to draw flue gas from the cyclones 4a,4b, 12. The gas suction port 28a is connected to the cyclones 4a,4b,12 via a communicating tube 29.

Figure 3:
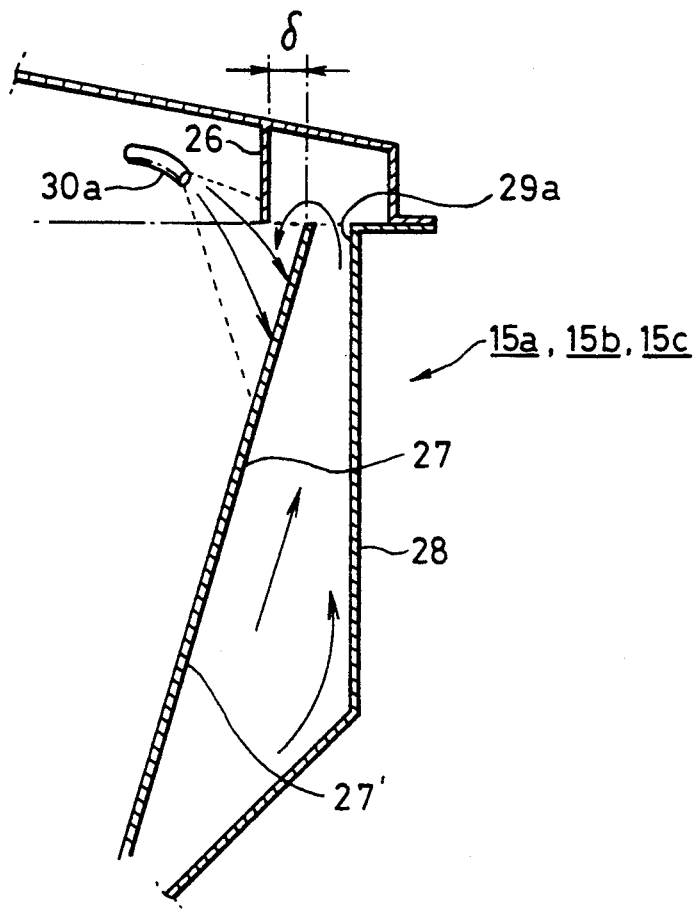

Fixedly secured on an upper part of the outer cylinder 28 is a cylindrical shroud 26 whose outer diameter is smaller than the inner diameter of the upper edge of the inner funnel 27. As is illustrated in FIG. 3, a lower-end peripheral edge of the shroud 26 lies at the same level as an upper-end peripheral edge of the inner funnel 27. The lower-end peripheral edge of the shroud 28 and the upper-end peripheral edge of the conical inner cylinder 27 defines a clearance 29a through which flue gas, which has flowed into the outer cylinder 28, is introduced into the inner funnel 27.

The dimension $\delta$ of this clearance 29a will next be described.

The flow rate $V_1$ of flue gas through the communicating tube 29 can be expressed by the following formula:

$$V_1 = A_{29} \times v_{29} \quad (1)$$

where A29: cross-sectional area of the communicating tube 29, and $v_{29}$: flow velocity of flue gas through the communicating tube 29.

Further, the area of the clearance 29a can be expressed by $\pi(d_2^2 - d_1^2)/4 = \pi(\delta^2 + d_1\delta)(d_2 - d_1 = 2\delta)$ where $d_1$ is the outer diameter of the lower end of the shroud 26 and $d_2$ is the inner diameter of the upper end of the inner funnel 27. The flow rate $V_2$ through the clearance 29a can therefore be expressed by the following formula:

$$V_2 = \pi(\delta + d_1\delta) \times v\delta \quad (2)$$

where $v\delta$: flow velocity of flue gas through the clearance 29a.

Since the flue gas flow rate $V_1$ through the communicating tube 29 and the flue gas flow rate $V_2$ through the clearance 29a must be equal to each other, $V_1 = V_2$. From the formulae (1) and (2), the following formula can be derived:

$$A_{29} \times v_{29} = p(\delta + d_1\delta) \times v\delta \quad (3)$$

In the formula (3), the value of the right side can be determined basically by the flow rate of flue gas from the boiler 1. However, the outer diameter $d_1$ of the lower end of the shroud 26 and the flow velocity $v\delta$ of flue gas through the clearance 29a, both of which are variables, must be determined in view of various parameters such as the temperature and pressure for liquefying gaseous contaminants in flue gas and the amount of fine solid particles in flue gas so that standard values cannot be indicated. Consequently, to determine the dimension $\delta$ of the clearance 29a, it is necessary to conduct various tests.

Figure 2:
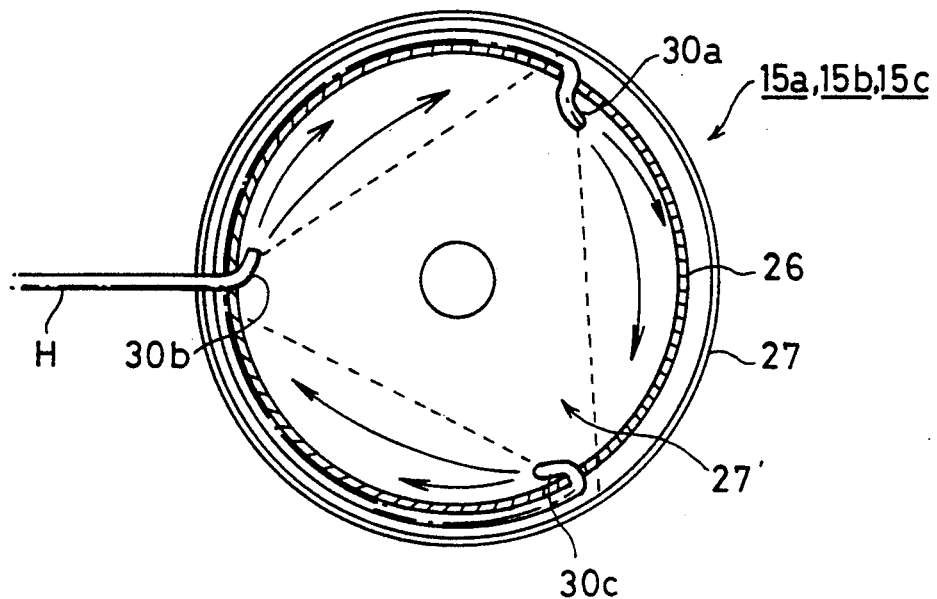

As is shown in FIG. 2, the three jet nozzles 30a,30b,30c are arranged at equal angular intervals on the circular periphery of the shroud 26 and the jetting direction of each of the jet nozzles 30a,30b,30c is directed in a tangential direction relative to the inner peripheral wall of the inner funnel 27. In addition, the jetting angle of each of the jet nozzles 30a,30b,30c is set such that, in FIG. 2, the outermost boundary of the jetted air indicated by a broken line substantially reaches to the adjacent jet nozzle.

The duct cross-sectional area of the "B-Line" from the blower 3 to the cyclones 4a,4b is set at about "3X/4−X/2" where X is the duct cross-sectional area of the "A-Line" from the cooler 2 to the blower 3. This is to increase the flow velocity through the "B-Line" so that a sufficient flue gas flow rate can be ensured for the cyclones 4a,4b. The duct cross-sectional area of the "B-Line" was determined by conducting tests.

Between the cyclones 5a,5b arranged on the downstream side of the cyclones 4a,4b and the force feed screw 17, rotary valves 16a,16b are provided to prevent the flue gas in the first auxiliary cyclones 5a,5b from directly flowing into the force feed screw 17.

The "C1-Line" is connected to the first auxiliary cyclones 5a,5b to return the flue gas to the "A-Line" again. The second auxiliary cyclones 7a,7b are provided in the "C1-Line". Provided downstream of the second auxiliary cyclones 7a,7b are the third auxiliary cyclones 8a,8b which are both connected to the force feed screw 17.

To the discharge port 27a of each of the flue gas treatment apparatuses 15a,15b, a communicating tube 22 is connected to guide to the fourth auxiliary cyclone 9 fine solid particles and flue gas discharged through the discharge port 27a. The fifth auxiliary cyclone 10 connected to the force feed screw 17 is provided downstream of the fourth auxiliary cyclone 9.

The blower 3, cyclones 4a,4b, first auxiliary cyclones 5a,5b, second auxiliary cyclones 7a,7b, third auxiliary cyclones 8a,8b, force feed screw 17, flue gas treatment apparatuses 15a,15b, fourth auxiliary cyclone 9, fifth auxiliary cyclone 10 and compressor 21 make up a single system. In the present embodiment, two systems are provided in parallel with the boiler 1. This was designed to improve the treatment ability of flue gas. If the amount of flue gas increases, it is necessary to provide more systems. It is to be noted that, in the present embodiment, the blower 3, force feed screw 17, fourth auxiliary cyclone 9, fifth auxiliary cyclone 10 and compressor 21 are used commonly for the individual systems.

To a desired position of the force feed screw 17, the "E-Line" is connected to discharge flue gas remaining in the force feed screw 17. The blower 11 and multi-cyclone 12 are provided downstream of the "E-Line".

To the multi-cyclone 12, the "F-Line" is connected to guide flue gas from the multi-cyclone 12 to the sixth auxiliary cyclone 13. In addition, a vent tube 12a is provided in an upper part of the multi-cyclone 12 in order to release the cleaned flue gas. The seventh auxiliary cyclone 14 is provided downstream of the sixth auxiliary cyclone 13.

Operation of the present embodiment will next be described.

Flue gas from the boiler 1 is cooled by the cooler 2 and then fed to the cyclones 4a,4b through the "A-Line", the blower 3 and the "B-Line".

Fine solid particles of about 1 μm and greater are collected within the cyclones 4a,4b and are downwardly fed together with a portion of the flue gas to the first auxiliary cyclones 5a,5b. In the first auxiliary cyclones 5a,5b, second auxiliary cyclones 7a,7b and third auxiliary cyclones 8a,8b, fine solid particles are collected further from the flue gas so fed and are fed to the force feed screw 17.

On the other hand, fine solid particles smaller than about 1 μm are not collected in the cyclones 4a,4b but are fed together with the flue gas into the outer cylinders 28 of the flue gas treatment apparatuses 15a,15b via the communicating tubes 29.

The flue gas inside each outer cylinder 28 is drawn into the inner funnel 27 through the clearance 29a by virtue of compressed air jetted out through the jet nozzles 30a,30b,30c. The pressure and flow rate of the compressed air are controlled in view of the temperature inside the inner funnel 27, the size of the inner funnel 27 and the like. This control is effected to retain a temperature required to liquefy gaseous contaminants, which are contained in the flue gas, in the inner funnel 27 and also to have an eddy current, which is formed inside the inner funnel 27, and substantially ceases at the discharge port 27a to avoid vibrations. The pressure of the compressed air is controlled at about 4.5–7.0 kg/cm$^2$ in the present embodiment.

Inside the inner funnel 27, the environment rises to a particular pressure owing to the introduction of compressed air and drops to a specific temperature. This temperature drop is caused by adiabatic expansion of the compressed air and also by effects inherent to cyclones.

Owing to the pressure rise and temperature drop inside the inner funnel 27, the gaseous contaminants in the flue gas are liquefied and then adsorbed on fine solid particles in the flue gas. In the course of their turning, progressive descent under the action of the compressed air, the fine solid particles are subjected to centrifugal force and are hence separated from the flue gas.

When the flue gas enters the inner funnel 27, water vapor in the flue gas is condensed into water because of the temperature drop of the flue gas. Water is also formed upon production of the compressed air. Fine solid particles are therefore adsorbed on these water molecules. This makes it possible to collect fine solid particles having substantially small particle sizes so that the collection efficiency for fine solid particles can be improved.

The remaining flue gas and the like are introduced into the fourth auxiliary cyclone 9 and fifth auxiliary cyclone 10, where the fine solid particles with air pollutants adsorbed thereon are separated from the remaining flue gas and are discharged to the force feed screw 17.

As has been described above, the present embodiment can remove gaseous and fine solid particulate contaminants from flue gas without any chemical facility, thereby reducing both the running cost and initial cost.

Inside the flue gas treatment apparatuses 15a,15b, deodorization making use of fine solid particles is also effected in addition to the treatment for the removal of fine solid particulate and gaseous contaminants.

Unburnt carbon is contained in flue gas from a combustion equipment like the boiler 1. This unburnt carbon conducts deodorization. The deodorization inside the flue gas treatment apparatuses 15a,15b promptly proceeds as the atmosphere is of elevated pressure and unburnt carbon is in the form of fine particles of about 1 μm and smaller.

The remaining flue gas from which fine solid particulate and gaseous contaminants have been substantially removed reaches the blower 11 from the fourth auxiliary cyclone 9 via the "D-Line" and the "E-Line" and is then blown into the multi-cyclone 12.

Final dust collection is conducted in the multi-cyclone 12. Fine solid particles are fed to the force feed screw 17 via a rotary valve 16c and the flue gas so cleaned is released through the vent tube 12a.

In this embodiment, the plural flue gas treatment apparatuses 15a,15b and the plural auxiliary cyclones 5a,7a, . . . are provided. The number of these equipments should be determined depending on the amount of flue gas to be produced and the degree of its contamination and shall not be construed as limiting the present invention.

The second embodiment of this invention will next be described with reference to FIG. 6 and FIGS. 7-1 through 7-3.

Figure 6:
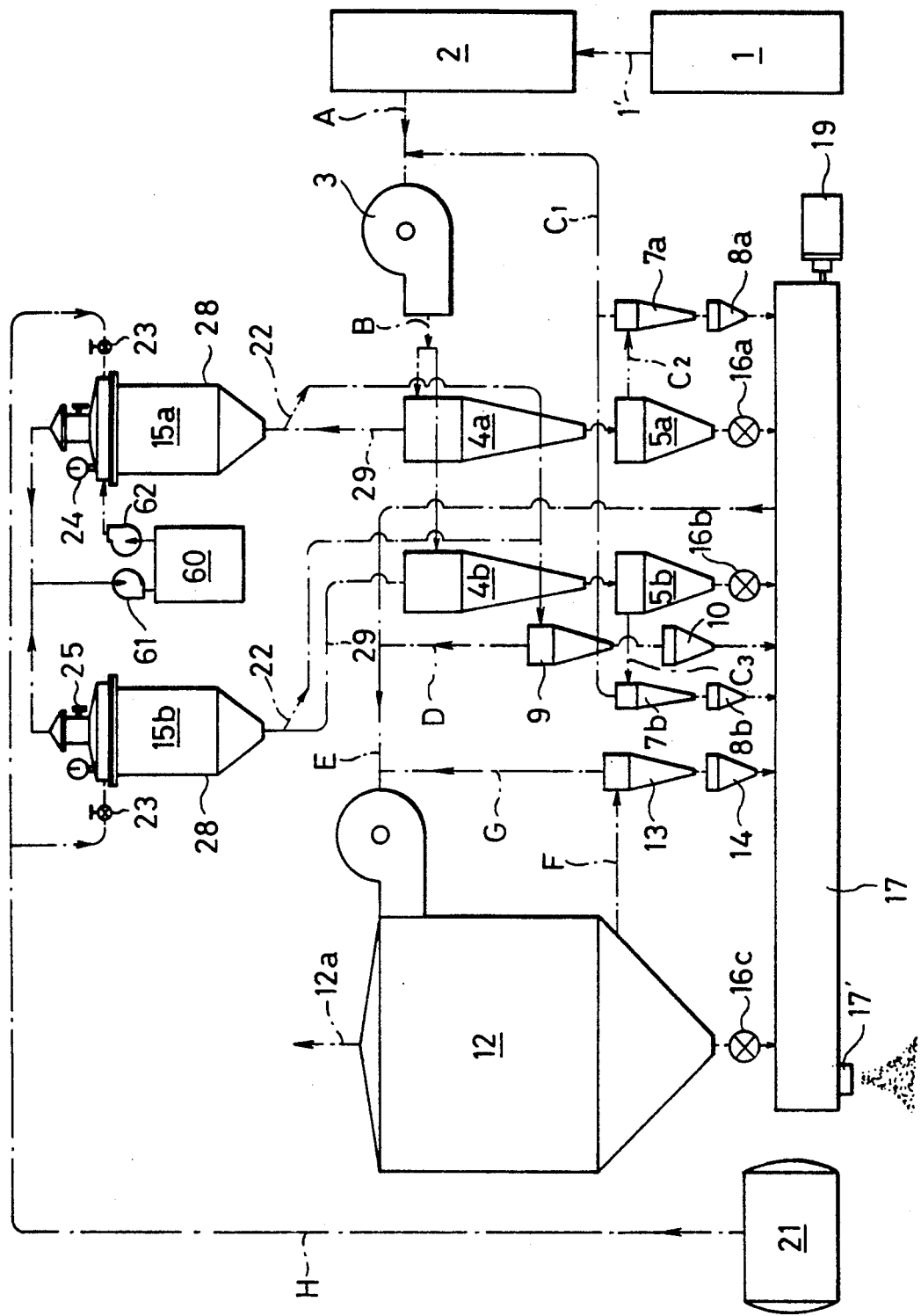

In this embodiment, as is depicted in FIG. 6, an auxiliary line is provided above the two flue gas treatment apparatuses 15a,15b, in other words, to free ends of the shut-off valves 25, and the auxiliary line terminates in a dust removing filter 60 so that flue gas can be returned again to the flue gas treatment apparatus 15a. To introduce a portion of the flue gas, which has been fed into the flue gas treatment apparatuses 15a,15b, into the dust removing filter 60 and also to force the flue gas to return again from the dust removing filter 60 to the flue gas treatment apparatus 15a, blowers 61,62 are provided in this embodiment. The remaining construction is similar to the corresponding construction in the first embodiment. In general, the amount of flue gas produced in the boiler 1 is unstable. The provision of the dust removing filter 60 in this embodiment is, therefore, to open the shut-off valves 25 of the flue gas treatment apparatuses 15a,15b when the flue gas treatment apparatuses 15a,15b cannot treat all of the flue gas, whereby any extra flue gas can be treated by the dust removing filter 60.

Since the basic construction of this embodiment is substantially the same as that of the first embodiment, its advantages are practically similar to those of the first embodiment except for the advantage described above.

Flue gas produced when used tires were burnt in the broiler 1 was treated using the system of this embodiment. Various measurement were carried out to determine the effects of the treatment. This will be described with reference to FIG. 7.

As is shown in the same figure, the concentration of soot and dust dropped from 16.2 g/m$^3$N at the entrance of the system to 0.02 g/m$^3$N at the exit of the system.

Such significant soot-and-dust-removing effects are believed to be attributed to very effective collection by water, which has been formed as a result of liquefaction of water vapor contained in the flue gas, in addition to centrifugal removal in the flue gas treatment apparatus 15a,15b and the various cyclones 5a,5b,7a, . . . as described above.

Further, the concentration of sulfur oxides dropped from 562 ppm by volume at the entrance of the system to 15 ppm by volume at the exit of the system. Regarding nitrogen oxides, their concentration dropped from 37 ppm by volume at the entrance to 15 ppm by volume at the exit of the system. In addition, removing effects were also observed with respect to hydrogen chloride, hydrogen sulfide, methyl sulfide and the like. Incidentally, the concentrations of sulfur oxides, nitrogen oxides and hydrogen chloride were within their respective environmental quality standards.

The soot and dust so recovered had the following compositions: 1.66 mg/kg As, 0.024 mg/kg T-Hg (the content of mercury including various mercury compounds), 3080 mg/kg Pb, 14.9 mg/kg Cd, 53.0 mg/kg T-Cr (the content of chromium including all chromium compounds), 1.08% $SiO_2$, 21.1 mg/kg CN, less than 0.0005 mg/kg PCB, less than 0.05 mg/kg O-P (organophosphorus), 36% C and 49.1% water.

As has been demonstrated above, the present embodiment and the first embodiment can efficiently remove fine solid particles, namely, soot and dust and can also eliminate various air pollutants.

The two embodiments of the present invention have been described above. In these embodiments, the boiler was exemplified as a flue gas source. The present invention is not limited to boilers but can be applied to any equipments as long as they produce flue gas, for example, diesel engines of ships, vehicles and the like, reactors in chemical plants, garbage incinerators, and so on.

I claim:

1. A treatment system for separating contaminants from a flue gas; said contaminants include a combination of large and small sized fine-solid particles, and gaseous contaminants; said treatment system comprising:

means for removing said large sized fine-solid contaminants from said flue gas;

means for removing said small sized fine-solid contaminates from said flue gas, including an outer container, an inner container and a shroud;

means for supplying compressed gas into said means for removing said small sized fine-solid contaminates from said flue gas;

means for supplying said flue gas to said means for removing said small sized fine-solid contaminates from said flue gas; and wherein said inner container is generally funnel-shaped and is arranged within said outer container such that a narrow portion of said inner container is directed toward said means for supplying said flue gas, and a wide portion of said inner container is directed toward said means for supplying compressed air; and said inner container, said outer container, and said shroud are arranged to allow said flue gas to flow between said inner and outer containers and into said shroud.

2. A treatment system according to claim 1, wherein:

said means for supplying compressed gas supplies said compressed gas into said wide portion of said inner container such that said flue gas flows from said shroud into said wide portion of said inner container through a predetermined clearance;

said supplied compressed gas co-acts with said inner container to alter environmental conditions within said inner container such that said gaseous contaminants in said flue gas is changed into liquified contaminants; and said liquified contaminants absorb said small sized fine-solid contaminates.

3. A treatment system according to claim 2, further comprising:

means for disposing said liquified contaminants with adsorbed small sized fine-solid contaminates from said means for removing said small sized fine-solid contaminates from said flue gas; and means for further treating said flue gas subsequent to treatment by said means for removing said small sized fine-solid contaminates from said flue gas.

4. A treatment system according to claim 2, further comprising:

means for treating an overflow of said flue gas from said means for removing said small sized fine-solid contaminates from said flue gas.

* * * * *